United States Patent
Federer

(10) Patent No.: US 9,618,960 B2
(45) Date of Patent: Apr. 11, 2017

(54) MULTIFUNCTIONAL OPERATING DEVICE FOR OPERATING A VEHICLE

(71) Applicant: KEHREL AG, Großräschen (DE)

(72) Inventor: Jörg Federer, Langerwehe (DE)

(73) Assignee: KEHREL AG, Großräschen (DE)

( * ) Notice: Subject to any disclaimer, the term of this patent is extended or adjusted under 35 U.S.C. 154(b) by 127 days.

(21) Appl. No.: 14/429,560

(22) PCT Filed: Oct. 7, 2013

(86) PCT No.: PCT/EP2013/003010
§ 371 (c)(1),
(2) Date: Mar. 19, 2015

(87) PCT Pub. No.: WO2014/056600
PCT Pub. Date: Apr. 17, 2014

(65) Prior Publication Data
US 2015/0227160 A1 Aug. 13, 2015

(30) Foreign Application Priority Data

Oct. 8, 2012 (DE) .................. 10 2012 019 718

(51) Int. Cl.
*G05G 5/03* (2008.04)
*B62D 1/04* (2006.01)
(Continued)

(52) U.S. Cl.
CPC .............. *G05G 5/03* (2013.01); *B60R 16/023* (2013.01); *B62D 1/043* (2013.01); *G05G 1/02* (2013.01); *Y10T 74/20396* (2015.01)

(58) Field of Classification Search
CPC .......... G05G 1/02; G05G 5/03; B60R 16/023; B62D 1/043; B62D 15/028; Y10T 74/20396

See application file for complete search history.

(56) References Cited

U.S. PATENT DOCUMENTS

| 5,905,237 A | 5/1999 | Hayakawa et al. |
| 2004/0050612 A1* | 3/2004 | Katae ............ B60L 1/003 180/315 |

(Continued)

FOREIGN PATENT DOCUMENTS

| DE | 39 18 229 C1 | 7/1990 |
| DE | 10 2010 002 325 A1 | 10/2010 |

(Continued)

OTHER PUBLICATIONS

International Preliminary Report on Patentability (Chapter I) dated Apr. 8, 2015, with English translation of International Search Report, received in International Patent Application No. PCT/EP2013/003010 (7 pages).

(Continued)

*Primary Examiner* — Barry Gooden, Jr.
(74) *Attorney, Agent, or Firm* — Michael Best & Friedrich LLP

(57) ABSTRACT

The invention provides, in one aspect, a multifunctional operating device for operating a motor vehicle. The operating device includes a handle and an operating head fixed to the handle. The operating head includes a head housing, a circuit board with at least one switch element, and a support part, mounted inside the head housing, upon which the circuit board is mounted. The switch element is configured to emit an acoustic response when actuated. The head housing is formed as a resonance body for amplifying the acoustic response.

17 Claims, 4 Drawing Sheets

(51) Int. Cl.
*B60R 16/023* (2006.01)
*G05G 1/02* (2006.01)

(56) References Cited

U.S. PATENT DOCUMENTS

| | | | | |
|---|---|---|---|---|
| 2005/0217920 | A1* | 10/2005 | Egan | B62D 1/043 |
| | | | | 180/315 |
| 2006/0096845 | A1* | 5/2006 | Zegula | B60K 37/06 |
| | | | | 200/341 |
| 2006/0191733 | A1 | 8/2006 | Paquin | |
| 2008/0266254 | A1* | 10/2008 | Robbins | G05D 1/0016 |
| | | | | 345/161 |
| 2009/0091469 | A1* | 4/2009 | Kempf | A61F 4/00 |
| | | | | 340/4.1 |
| 2010/0301243 | A1* | 12/2010 | Knittel | B60H 1/00985 |
| | | | | 251/129.03 |
| 2012/0039052 | A1* | 2/2012 | Valles Rangel | G07C 9/00944 |
| | | | | 361/752 |
| 2013/0018524 | A1* | 1/2013 | Ankers | A61G 5/045 |
| | | | | 701/1 |
| 2014/0172186 | A1* | 6/2014 | Mashkevich | G05G 1/00 |
| | | | | 701/1 |
| 2014/0262705 | A1* | 9/2014 | Srbinovski | B60R 16/005 |
| | | | | 200/61.54 |
| 2015/0097793 | A1* | 4/2015 | Lisseman | B62D 1/04 |
| | | | | 345/173 |

FOREIGN PATENT DOCUMENTS

| | | |
|---|---|---|
| DE | 10 2010 028 450 A1 | 11/2011 |
| DE | 10 2011 013 368 A1 | 9/2012 |
| EP | 1 772 345 B1 | 3/2010 |

OTHER PUBLICATIONS

International Search Report received in International Patent Application No. PCT/EP2013/003010, dated Jan. 16, 2014.

* cited by examiner

MULTIFUNCTIONAL OPERATING DEVICE FOR OPERATING A VEHICLE

FIELD OF THE INVENTION

The present invention relates to a multifunctional operating device for operating a vehicle for disabled people.

BACKGROUND OF THE INVENTION

To make it possible for disabled people to actuate a vehicle, such as a motor vehicle, a wheelchair or an electric car, individually configured operating devices are to be provided. Depending on the nature of the user's disability, different operating devices are to be provided, especially if the operating device is to be multifunctional. Various multifunctional operating elements are known from the art, for example from EP 1 772 345 B1.

SUMMARY OF THE INVENTION

The invention provides, in one aspect, a multifunctional operating device for operating a motor vehicle. The operating device includes a handle and an operating head fixed to the handle. The operating head includes a head housing, a circuit board with at least one switch element, and a support part, mounted inside the head housing, upon which the circuit board is mounted. The switch element is configured to emit an acoustic response when actuated. The head housing is formed as a resonance body for amplifying the acoustic response.

For multifunctional operating devices to be used for controlling vehicles, they have to have high operational reliability, for example so as to prevent operating errors. Further, the multifunctional devices should be low-maintenance and have a high service life, since maintenance often cannot be carried out by the disabled people themselves, meaning that they always have to hire a third party, and this is expensive. The invention therefore provides a multifunctional operating device for operating a vehicle which has high operational reliability and a long service life together with a simple and cost-effective construction.

The multifunctional operating device according to the invention has the advantage that it gives the user an acoustic response, in such a way that he receives confirmation when he has actuated a key or a switch of the multifunctional operating device. For this purpose, the multifunctional operating device according to the invention comprises a handle and an operating head, which are fixed together. The operating head further comprises a head housing, a support part and a circuit board comprising at least one switch element. According to the invention, the circuit board is fixed to the support part and the support part is fixed to the head housing. Meanwhile, according to the invention, it is provided that the head housing acts as a resonance body and thus amplifies an acoustic response which according to the invention comes from a switch element. Thus, the user of the vehicle can hear the acoustic response clearly, even in the presence of loud background noises, which may occur during the operating of a vehicle. In particular, the present invention provides that the circuit board is mounted on the support part, in such a way that the circuit board is not directly connected to the head housing, as is the case in the prior art (where the circuit board is glued to the head housing). Since the handle and the operating head are preferably formed hollow, a large resonance body is available for the acoustic response generated by the switch element, and so the acoustic response is amplified.

In a preferred embodiment, the multifunctional operating device comprises a keypad, the keypad being subdivided into a plurality of keys and being attached to the support part. It is preferably further provided that the switch elements attached to the circuit board can be actuated by the keys of the key pad.

Further, it is preferably provided that the acoustic response is a mechanically generated noise. Particularly preferably, the acoustic response is a click noise. A configuration of this type is therefore not dependent on an electrical power supply, and leads to a longer service life than would be possible for example using a battery-powered loudspeaker system. Further, the lack of electronics increases the reliability and thus the operational reliability of the multifunctional operating device. Nevertheless, the user can be given an acoustic response which he can perceive even in the presence of relatively loud background noises. This eliminates the risk of undesirable operating errors, and can therefore likewise contribute to the operational reliability of the operating device.

In a further preferred embodiment of the invention, the circuit board is positively attached to the support part. In particular, the circuit board is attached to the support part via additional connection means, for example via screws. This makes it possible to transmit oscillations, resulting from the acoustic response of the switch element, without any damping, such as would occur for example in a non-positive prior art connection.

In this context, it is particularly preferably provided that the support part is formed as a resonator for the acoustic response of the switch element. This may for example be achieved in that a gap is left between the circuit board and the support part. This gap can thus act as a resonance volume and amplify the acoustic response of the switch element. A gap of this type can be achieved very easily by way of the positive connection, for example using screws.

Further, it is preferably provided that the support part is positively connected to the head housing. Particularly preferably, latch elements are used to connect the support part and the head housing. The support part is thus preferably suspended floating freely in the head housing, and can therefore oscillate within the resonance body. The circuit board preferably does not touch the head housing, in such a way that the circuit board also does not impede free oscillation.

Particularly preferably, it is provided that the support part is configured in such a way that oscillations are transmitted to the head housing. It is thus possible also to give the user the acoustic response of the switch element as a haptic response. Since the user of the multifunctional operating device usually places his hand on the handle and his fingers on the operating head, the actuation of the switch element can be displayed to the user even more clearly by using the haptic response in addition to the acoustic response. Thus, in the case of very loud background noises, for which the acoustic response is no longer perceptible, the operator can still be given feedback concerning the operation of keys or switches of the multifunctional operating device.

Advantageously, it is moreover provided that the multifunctional operating device comprises a multifunctional operating device. By means of the signal transmission device, it is possible to give a signal to a vehicle which is to be controlled, it being possible for the signal to contain a command generated by the switch element. In particular, the signal transmission device may be an infra-red transmitter or radio transmitter. It is particularly preferably provided that one or more functions of the vehicle can be controlled via the at least one switch element.

Preferably, the multifunctional operating device comprises a mounting via which the operating device can be fixed to a vehicle to be controlled. In particular, the operating device may be attached to a steering wheel of the vehicle or to a separate operating lever, for example for braking and accelerating the vehicle.

In a further advantageous embodiment, the multifunctional operating device comprises a plurality of switch elements, each switch element generating an individual acoustic response. For example, turning on an indicator can thus be distinguished from activating the windscreen wipers just from the acoustic response.

Finally, it is advantageous for the multifunctional operating device to comprise a compensation element. The compensation element bears between 30% and 40% of the total weight of the multifunctional operating device, and thus makes automatic orientation of the multifunctional operating device possible when it is not being held by the user. For example, it is preferably provided that the compensation element is attached to an end of the handle remote from the operating head, in such a way that, when it is not being held, the multifunctional operating device is always orientated in such a way that the end of the handle provided with the compensation element always forms the lowest point of the multifunctional operating device. This advantageously makes it possible for the user to grasp the handle and the operating head without twisting his hand.

BRIEF DESCRIPTION OF THE DRAWINGS

In the following, preferred embodiments of the invention are disclosed with reference to the accompanying drawings, in which.

DETAILED DESCRIPTION

Figure 1:
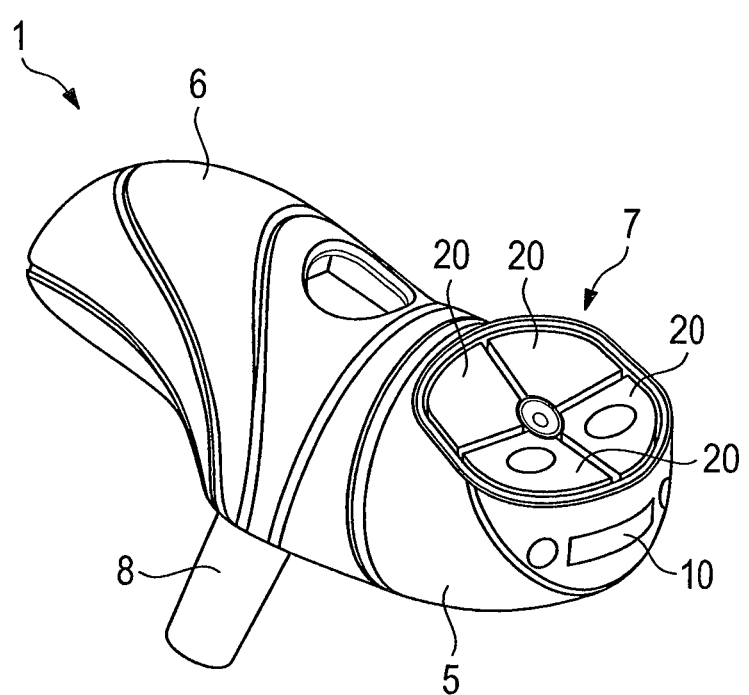
FIG. 1 is a perspective view of a multifunctional operating device in accordance with an embodiment of the invention.

FIG. 1 schematically shows a multifunctional operating device 1 in accordance with a preferred embodiment of the invention. The multifunctional operating device 1 comprises a handle 6, on which a user can rest his hand, and an operating head 7, via which the user can control functions of a vehicle which is to be operated, for example using a finger. For this purpose, the operating head 7 comprises a plurality of keys 20 which can be actuated by the user. Via the keys 20, it is possible for a user to select various commands, which are transmitted via a signal transmission device 10, for example via an infrared eye or via a radio transmitter, to the vehicle which is to be operated. To connect the multifunctional operating device according to the invention to the vehicle, a mounting 8 in the form of a tube is attached to the handle 6.

Figure 2:
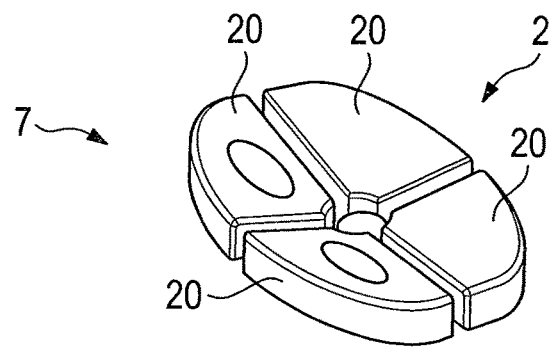
FIG. 2 is an exploded perspective view of an operating head of the multifunctional operating device of FIG. 1.
Figure 2:
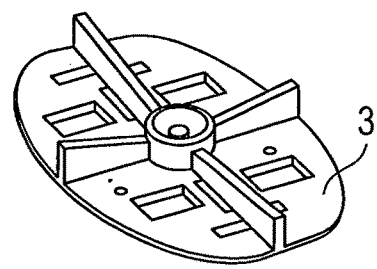
Figure 2:
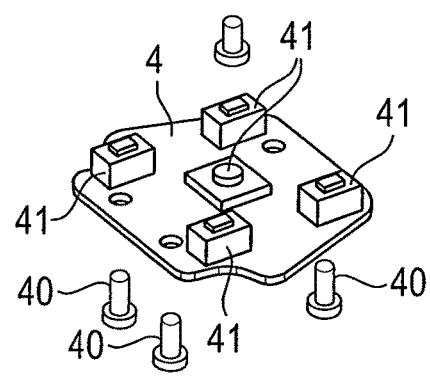
Figure 2:
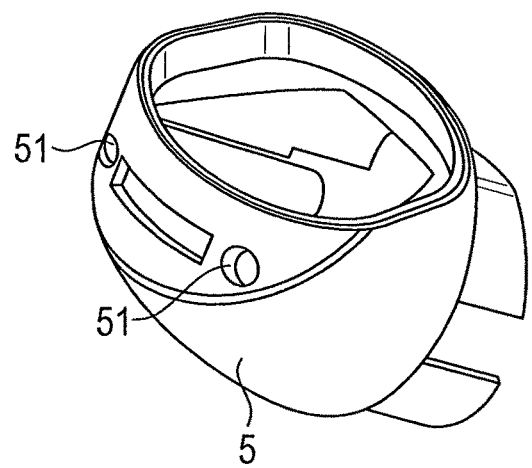

FIG. 2 clarifies the construction of the operating head 7 by showing the components comprised by the operating head 7 in an exploded view. A support part 3 is used to receive a circuit board 4 on the one hand and a keypad 2 on the other hand. The circuit board 4 comprises a plurality of switch elements 41, which are to be operated using the keys 20 of the keypad 2. Therefore, both the keypad 2 and the circuit board 4 are connected to the support part 3, in such a way that the keys 20 act on the switch elements 41. In particular, the circuit board 4 is fixed to the support part 3 using screws 40. The support part 3 is in turn inserted into a head housing 5 of the operating head 7. The head housing 5, like the handle 6, is formed hollow and thus forms a resonance body for the switch elements 41 which are introduced into the head housing 5 via the support part 3 and the circuit board 4.

The switch elements 41 are formed in such a way that they generate a noise mechanically when actuated. This noise is therefore amplified by the substantially empty hollow body of the head housing 5 and of the handle 6, in such a way that it remains clearly audible even in the presence of relatively loud background noises, which may occur at any time during the operation of a vehicle.

Figure 3:
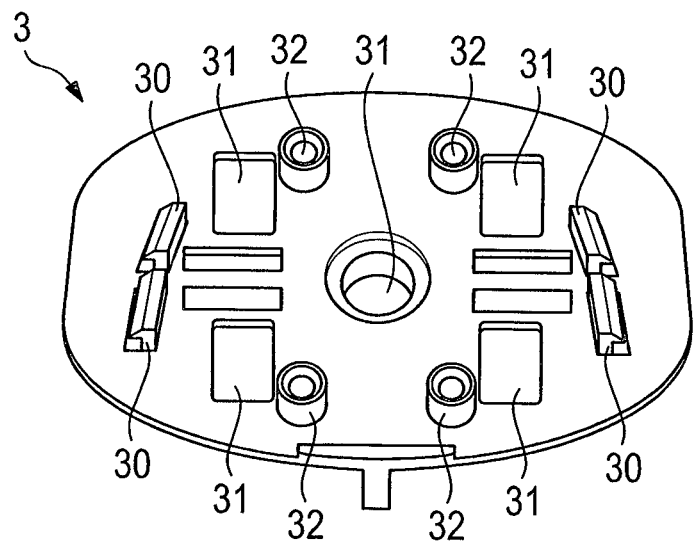
FIG. 3 is a bottom perspective view of a support part of the multifunctional operating device of FIG. 1.

The precise construction of the housing, which acts as a resonance body, of the multifunctional operating device is shown in FIGS. 3 to 6. FIG. 3 shows the support part 3, which comprises a plurality of openings 31. Via these openings 31, it is possible for the keypad 2, which is fixed on one side of the support part, to gain access to the switch elements 41 of the circuit board 4, which is fixed to another side of the support part 3 (see also FIG. 2). For fixing the circuit board 4, there are various posts 32 which are formed for receiving screws. It is thus possible to define a distance between the circuit board 4 and the support part 3 using the height of the posts 32, resulting in a gap 33 between the circuit board 4 and the support part 3 (cf. FIG. 5). The support part 3 thus acts as a resonator for the switch elements 41 of the circuit board 4, in that the switch elements 41 introduce sound into the gap between the circuit board 4 and the support part 3.

Figure 4:
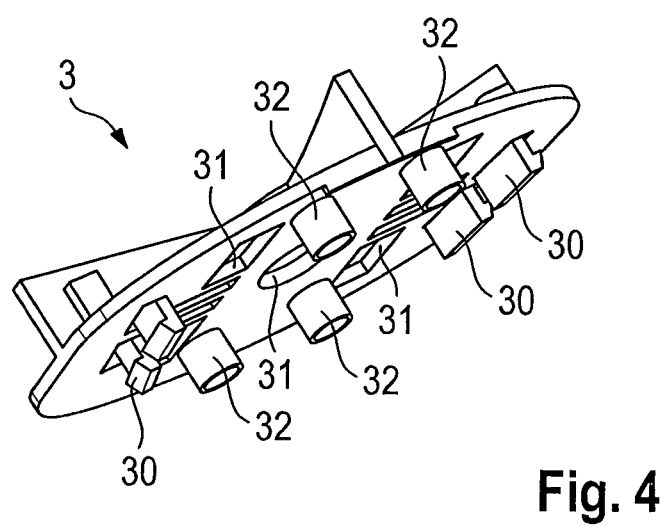
FIG. 4 is a a bottom perspective view of the support part of the multifunctional operating device of FIG. 1, from a different perspective.

From FIG. 4, it can further be seen that the support part 3 comprises various latch elements 30. Via the latch elements 30, the support part can be connected to the head housing 5. The support part 3 is thus connected to the head housing 5 so as to be able to oscillate, meaning that oscillations can be transmitted from the switch elements 41 via the support part 3 to the head housing 5. In addition to the acoustic response, there is thus also a haptic response to the user. He can therefore both hear the response and trace it using the hand resting on the multifunctional operating device 1.

Figure 5:
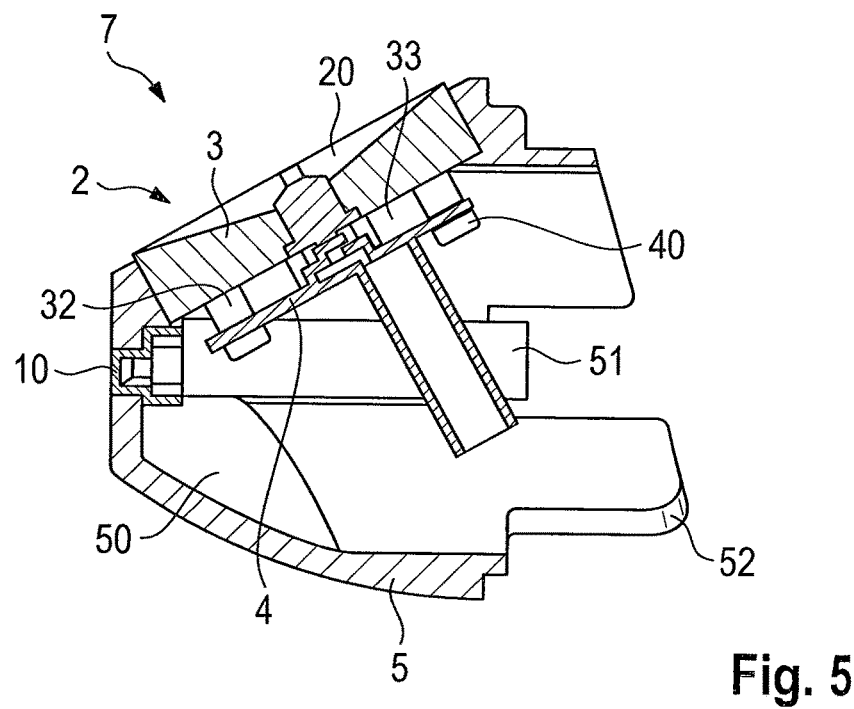
FIG. 5 is a sectional view of the operating head of the multifunctional operating device of FIG. 1.
Figure 6:
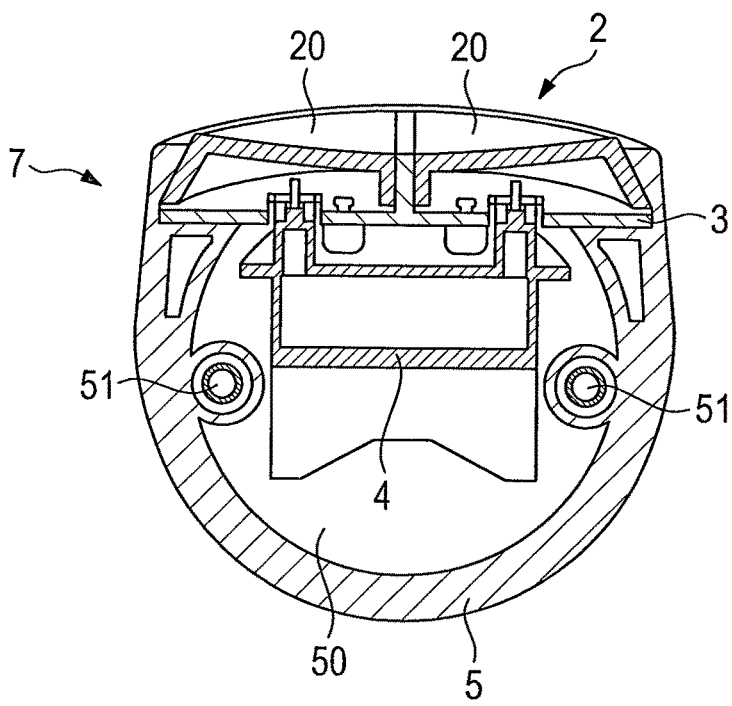
FIG. 6 is a further sectional view of the operating head of the multifunctional operating device of FIG. 1.

FIGS. 5 and 6 are each a sectional view through the operating head 7 according to the invention. It can be seen that the operating head 7 comprises a resonance body 50, since the interior of the head housing 5 is substantially free volume. By way of the support part 3, both the keypad 2 and the circuit board 4 are mounted. It can be seen that apart from the support part 3 the circuit board 4 does not touch any further components of the operating head 7.

The circuit board 4 is connected to the support part 3 using screws 40. For this purpose, the screws 40 are screwed into posts 32, in such a way that the posts 32 define the gap 3 between the circuit board 4 and the support part 3. The gap 33 thus acts as a first resonance volume for amplifying the acoustic response of the switch elements 41. Further, as a result of the floating attachment of the support part 3 to the inside of the head housing 5, the oscillations can be introduced into the resonance body 50 without damping. Since the head housing 5 comprises a connection region 52, via which the head housing can be connected to the likewise substantially hollow handle 6, the resonance body 50 extends not only onto the operating head 7 but also onto the handle 6 (second resonance volume). The connection between the operating head 7 and the handle 6 is likewise provided using screws, but these are guided in corresponding screw channels 51 so as to prevent the oscillations from being damped within the resonance body 50.

As a result of the construction according to the invention of the multifunctional operating device, it is therefore possible for the sound of the acoustic response of the switch elements 41 to be introduced into the resonance body 50 undamped. This in turn means that the acoustic responses of the individual switching elements are amplified considerably, and are thus clearly perceptible even in the presence of background noises. Further, the strong amplification inside the resonance body also makes haptic perception of the acoustic response of the switch elements 41 possible for a hand resting on the multifunctional operating device 1.

The signal transmission device 10, which is configured as an infrared eye, can further be seen in FIG. 5. In an alternative embodiment, the signal transmission device 10 may be configured as a radio transmitter. In this case, an opening in the head housing 5, as required for the infrared eye, is no longer necessary. In this way, the commands selected by the user by pressing the individual keys 20 can be transmitted to the vehicle.

Preferably, the multifunctional operating device 1 is mounted on a steering wheel of a vehicle or on a separate operating lever. This ensures that the multifunctional operating device 1 can always be reached comfortably by the user. This provides high operational reliability.

Various features of the invention are set forth in the following claims.

The invention claimed is:
1. A multifunctional operating device for operating a motor vehicle, comprising;
  a handle; and
  an operating head fixed to the handle, the operating head including a head housing and a circuit board with at least one switch element;
  wherein the operating head includes a support part, wherein the circuit board is mounted on the support part, which is mounted inside the head housing, wherein the at least one switch element is configured to emit an acoustic response when actuated, and wherein the head housing is formed as a resonance body for amplifying the acoustic response.

2. The multifunctional operating device of claim 1, further comprising a signal transmission device for transmitting a command generated by the at least one switch element to the motor vehicle.

3. The multifunctional operating device of claim 1, wherein one or more functions of the motor vehicle can be controlled via the at least one switch element.

4. The multifunctional operating device of claim 1, further comprising a mounting via which the handle can be fixed to the motor vehicle.

5. The multifunctional operating device of claim 1, further comprising a compensation element arranged in the handle, the compensation element making up a proportion between 30% and 40% of a total weight of the multifunctional operating device.

6. The multifunctional operating device of claim 1 wherein the acoustic response of the switch element is a mechanically generated noise.

7. The multifunctional operating device of claim 6, wherein the mechanically generated noise is a click noise.

8. The multifunctional operating device of claim 1, wherein the circuit board is positively connected to the support part via additional connection means.

9. The multifunctional operating device of claim 8, wherein the support part is configured to act as a resonator for the acoustic response of the at least one switch element.

10. The multifunctional operating device of claim 8, wherein the additional connection means are configured as screws.

11. The multifunctional operating device of claim 1, wherein the support part is positively connected to the head housing by latch elements.

12. The multifunctional operating device of claim 11, wherein the support part is configured to transmit oscillations to the head housing to provide a haptic response.

13. The multifunctional operating device of claim 12, wherein the haptic response supplements the acoustic response.

14. The multifunctional operating device of claim 1, further comprising a keypad having at least one key, wherein the keypad is attached to the support part, and wherein the switch element can be actuated via the at least one key.

15. The multifunctional operating device of claim 14, further comprising a signal transmission device for transmitting a command generated by the switch element to the motor vehicle.

16. The multifunctional operating device of claim 15, further comprising a mounting via which the handle can be fixed to the motor vehicle.

17. The multifunctional operating device of claim 16, further comprising a compensation element arranged in the handle, the compensation element making up a proportion between 30% and 40% of a total weight of the multifunctional operating device.

* * * * *